United States Patent
Ambat et al.

(10) Patent No.: US 9,619,350 B1
(45) Date of Patent: Apr. 11, 2017

(54) SYSTEMS AND METHODS FOR APPLICATION-CONSISTENT DISASTER RECOVERY USING A VIRTUAL STORAGE CONTROLLER AND REMOTE STORAGE

(71) Applicant: Dell Products L.P., Round Rock, TX (US)

(72) Inventors: Gopakumar Ambat, Bangalore (IN); Yask Sharma, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 18 days.

(21) Appl. No.: 14/880,502

(22) Filed: Oct. 12, 2015

(51) Int. Cl.
*G06F 3/06* (2006.01)
*G06F 11/20* (2006.01)
*G06F 11/14* (2006.01)

(52) U.S. Cl.
CPC .......... *G06F 11/2058* (2013.01); *G06F 3/065* (2013.01); *G06F 3/067* (2013.01); *G06F 3/0619* (2013.01); *G06F 11/1435* (2013.01); *G06F 11/1451* (2013.01); *G06F 11/2069* (2013.01)

(58) Field of Classification Search
CPC .... G06F 11/2058; G06F 3/0619; G06F 3/065; G06F 3/067; G06F 11/1435; G06F 11/1451; G06F 11/2069
USPC ......... 711/162, 111, 112, 114, 156; 707/639, 707/649, 655, 658; 714/4.11, 6.3
See application file for complete search history.

(56) References Cited

U.S. PATENT DOCUMENTS

| | | | | |
|---|---|---|---|---|
| 7,043,485 B2* | 5/2006 | Manley | ............. | G06F 17/30212 707/658 |
| 7,111,194 B1* | 9/2006 | Schoenthal | ......... | G06F 11/2069 707/999.202 |
| 7,162,662 B1* | 1/2007 | Svarcas | ............. | G06F 17/30088 707/E17.005 |
| 7,225,204 B2* | 5/2007 | Manley | ............... | G06F 11/2066 707/639 |
| 7,363,537 B1* | 4/2008 | Svarcas | ............... | G06F 11/2074 707/E17.005 |

(Continued)

*Primary Examiner* — Stephen Elmore
(74) *Attorney, Agent, or Firm* — Jackson Walker L.L.P.

(57) ABSTRACT

An information handling system may include a processor and a first storage management console comprising a program of executable instructions embodied in non-transitory computer-readable media accessible to the processor, and configured to, when read and executed by the processor: (i) manage input/output between an application and a primary physical storage controller to perform input/output between the application and a storage resource communicatively coupled to primary physical storage container; (ii) asynchronously mirror application-consistent snapshots of data associated with the application from the primary physical storage controller to a storage virtual controller configured to emulate a physical storage controller such that the storage virtual controller stores the snapshots to remote storage geographically remote from the information handling system; (iii) store metadata associated with the application and data stored to the storage resource and the remote storage; and (iv) copy the metadata to a second storage management console executing on a second information handling system geographically remote from the information handling system.

18 Claims, 5 Drawing Sheets

(56) References Cited

U.S. PATENT DOCUMENTS

| | | | | |
|---|---|---|---|---|
| 7,370,163 B2* | 5/2008 | Yang | .................... | G06F 3/0617 |
| | | | | 365/189.05 |
| 7,617,217 B1* | 11/2009 | Chen | .................... | G06F 11/1435 |
| 7,769,717 B2* | 8/2010 | Federwisch | ......... | G06F 11/1451 |
| | | | | 707/649 |
| 7,818,299 B1* | 10/2010 | Federwisch | ......... | G06F 11/2066 |
| | | | | 707/620 |
| 8,341,364 B2* | 12/2012 | Coronado | ........... | G06F 11/2074 |
| | | | | 711/161 |
| 8,627,135 B2* | 1/2014 | Aron | .................... | G06F 11/2028 |
| | | | | 714/4.1 |
| 9,471,444 B2* | 10/2016 | Aron | .................... | G06F 11/2028 |
| 2003/0182312 A1* | 9/2003 | Chen | .................... | G06F 11/1435 |
| 2016/0098331 A1* | 4/2016 | Banka | ................. | G06F 11/1471 |
| | | | | 714/6.21 |

* cited by examiner

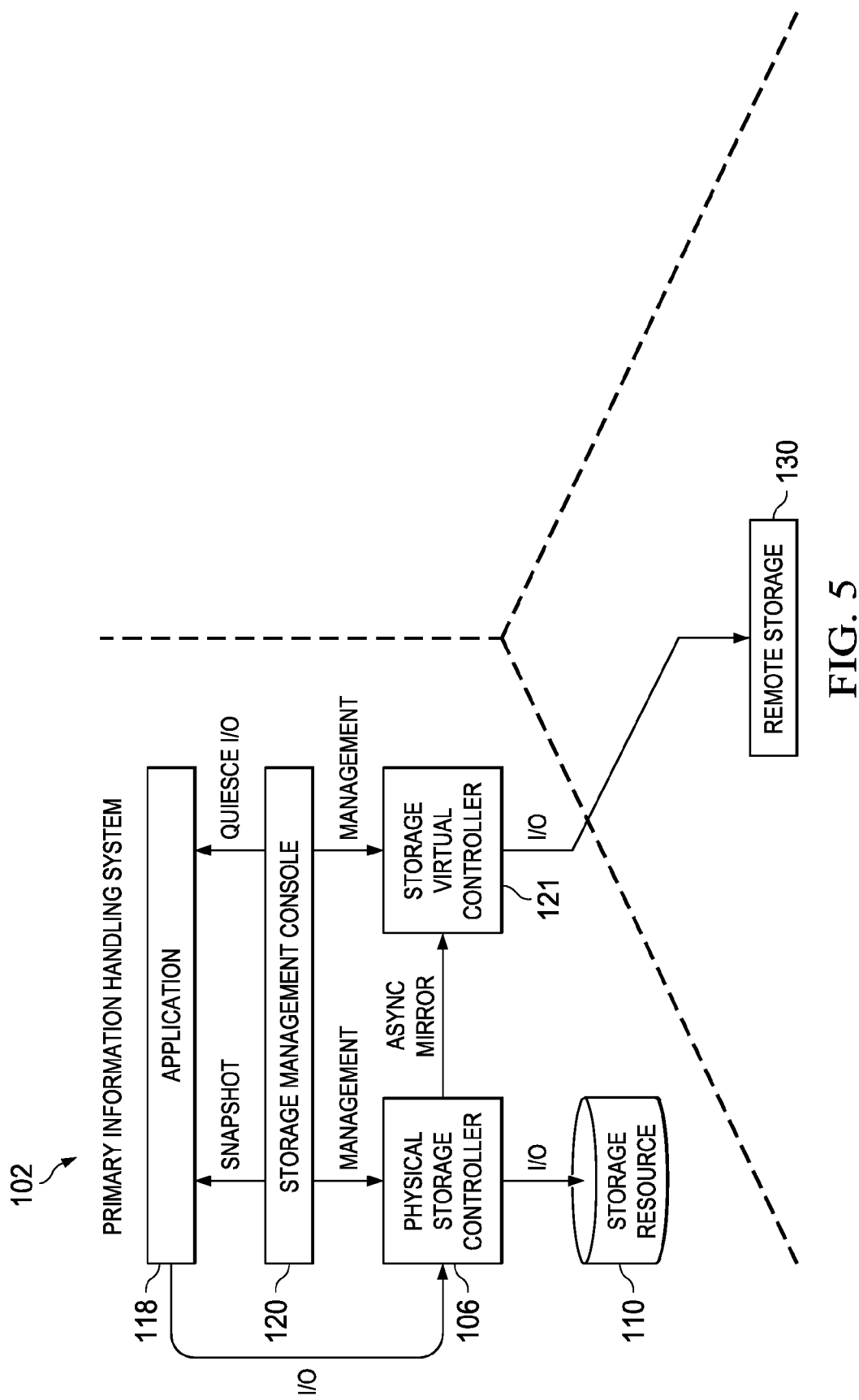

SYSTEMS AND METHODS FOR APPLICATION-CONSISTENT DISASTER RECOVERY USING A VIRTUAL STORAGE CONTROLLER AND REMOTE STORAGE

TECHNICAL FIELD

The present disclosure relates in general to information handling systems, and more particularly to disaster recovery of data in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many computing applications, information handling systems store massive amounts of data, and such information handling systems must often be capable of providing continuity of access to such data via a well-defined disaster recovery plan. Oftentimes, to provide greater robustness, it is desirable to provide for geographically-distributed recovery as opposed to single-site recovery.

SUMMARY

In accordance with the teachings of the present disclosure, the disadvantages and problems associated with existing approaches to disaster recovery may be reduced or eliminated.

In accordance with embodiments of the present disclosure, an information handling system may include a processor and a first storage management console comprising a program of executable instructions embodied in non-transitory computer-readable media accessible to the processor, and configured to, when read and executed by the processor: (i) manage input/output between an application and a primary physical storage controller to perform input/output between the application and a storage resource communicatively coupled to primary physical storage container; (ii) asynchronously mirror application-consistent snapshots of data associated with the application from the primary physical storage controller to a storage virtual controller configured to emulate a physical storage controller such that the storage virtual controller stores the snapshots to remote storage geographically remote from the information handling system; (iii) store metadata associated with the application and data stored to the storage resource and the remote storage; and (iv) copy the metadata to a second storage management console executing on a second information handling system geographically remote from the information handling system.

In accordance with embodiments of the present disclosure, a method may include managing, by a first storage management console instantiated on a first information handling system, input/output between an application and a primary physical storage controller to perform input/output between the application and a storage resource communicatively coupled to the primary physical storage controller. The method may also include asynchronously mirroring, by the first storage management console, application-consistent snapshots of data associated with the application from the primary physical storage controller to a storage virtual controller configured to emulate a physical storage controller such that the storage virtual controller stores the snapshots to remote storage geographically remote from the first information handling system. The method may further include storing, by the first storage management console, metadata associated with the application and data stored to the storage resource and the remote storage. The method may additionally include copying, by the first storage management console, the metadata to a second storage management console executing on a second information handling system geographically remote from the first information handling system.

In accordance with embodiments of the present disclosure, an article of manufacture may include a non-transitory computer readable medium and computer-executable instructions carried on the computer readable medium, the instructions readable by a processor, the instructions, when read and executed, for causing the processor to: (i) manage, by a first storage management console instantiated on a first information handling system, input/output between an application and a primary physical storage controller to perform input/output between the application and a storage resource communicatively coupled to the primary physical storage controller; (ii) asynchronously mirror, by the first storage management console, application-consistent snapshots of data associated with the application from the physical storage controller to a storage virtual controller configured to emulate a physical storage controller such that the storage virtual controller stores the snapshots to remote storage geographically remote from the first information handling system; (iii) store, by the first storage management console, metadata associated with the application and data stored to the storage resource and the remote storage; and (iv) copy, by the first storage management console, the metadata to a second storage management console executing on a second information handling system geographically remote from the first information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 illustrates a block diagram of a hierarchy for various components of the system depicted in FIG. 1 during normal operation in a single-site system, in accordance with embodiments of the present disclosure.

DETAILED DESCRIPTION

Figure 1:
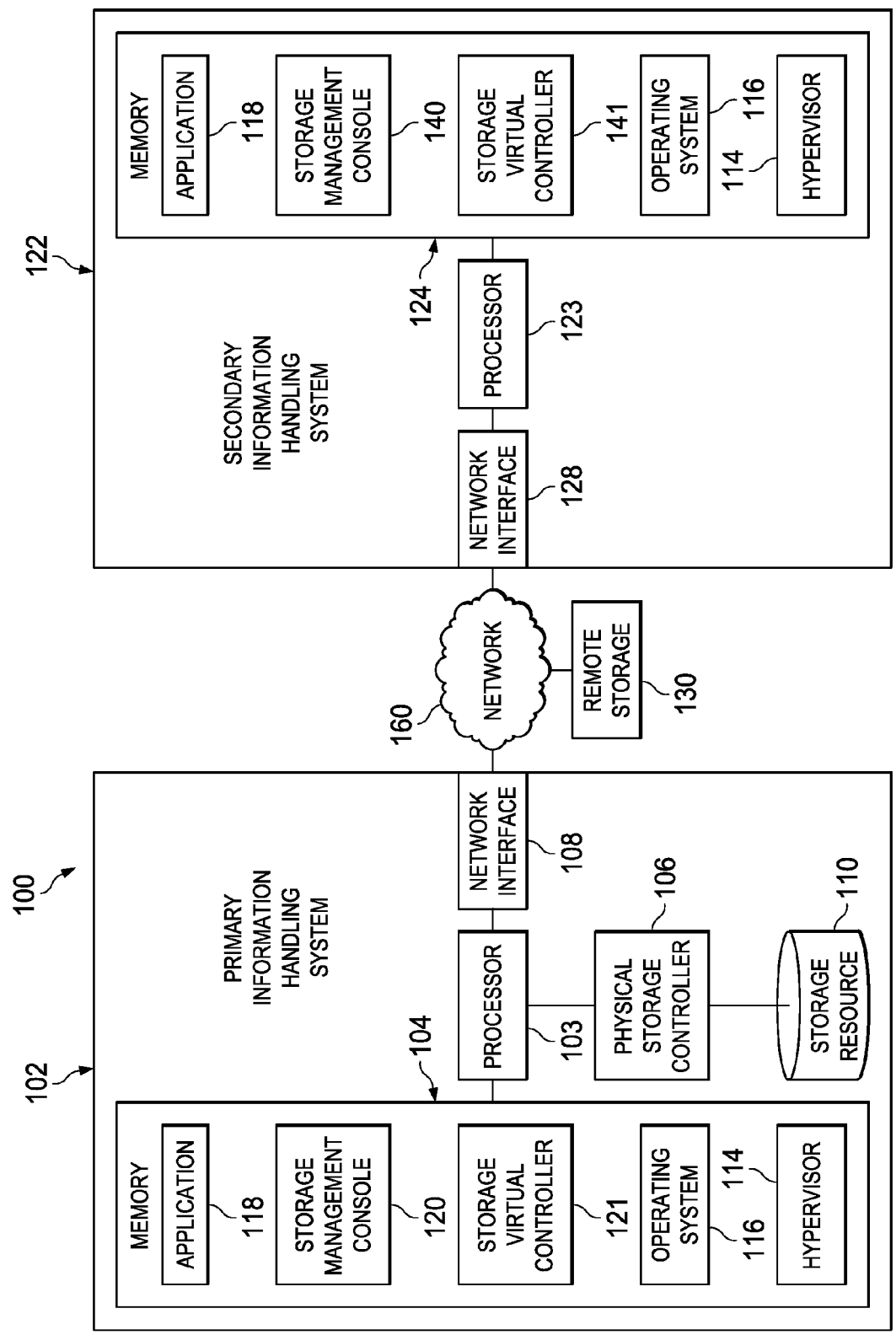
FIG. 1 illustrates a block diagram of a system for disaster recovery, in accordance with embodiments of the present disclosure.

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/ or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of a system 100 for disaster recovery, in accordance with embodiments of the present disclosure. As shown in FIG. 1, system 100 may include a primary information handling system 102, secondary information handling system 122, and remote storage 130 coupled to one another via network 160. In some embodiments, one or more of information handling system 102, secondary information handling system 122, and remote storage 130 may be geographically remote from one another. As used herein, "geographically remote" means physically separated in distance such that a calamity (e.g., power outage, natural disaster, fire, bad weather) occurring that causes a fault or failure of one of information handling system 102, secondary information handling system 122, and remote storage 130 is substantially unlikely to cause a fault or failure of the other of information handling system 102, secondary information handling system 122, and remote storage 130. Thus, in some instances, "geographically remote" may mean location in a different building. In other instances, "geographically remote" may mean location in a different city, state, region, province, territory, or nation.

In some embodiments, primary information handling system 102 may comprise a server. In these and other embodiments, primary information handling system 102 may comprise a personal computer. In other embodiments, primary information handling system 102 may be a portable computing device (e.g., a laptop, notebook, tablet, handheld, smart phone, personal digital assistant, etc.). As depicted in FIG. 1, primary information handling system 102 may include a processor 103, a memory 104 communicatively coupled to processor 103, a physical storage controller 106 communicatively coupled to processor 103, a storage resource 110 communicatively coupled to physical storage controller 106, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 110, and/or another component of primary information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to primary information handling system 102 is turned off.

As shown in FIG. 1, memory 104 may have stored thereon a hypervisor 114, an operating system 116, an application 118, a storage management console 120, and a storage virtual controller 121. Hypervisor 114 may comprise software and/or firmware generally operable to allow multiple virtual machines and/or operating systems (e.g., operating system 116 and other operating systems and/or multiple versions of operating system 116) to run on a single computing system (e.g., primary information handling system 102) at the same time. This operability is generally allowed via virtualization, a technique for hiding the physical characteristics of computing system resources (e.g., physical hardware of the computing system) from the way in which other systems, applications, or end users interact with those resources. Hypervisor 114 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

In one embodiment, hypervisor 114 may comprise a specially-designed OS with native virtualization capabilities. In another embodiment, hypervisor 114 may comprise a standard OS with an incorporated virtualization component for performing virtualization.

In another embodiment, hypervisor 114 may comprise a standard OS running alongside a separate virtualization application. In this embodiment, the virtualization application of hypervisor 114 may be an application running above an operating system (e.g., operating system 116) and interacting with computing system resources only through the operating system. Alternatively, the virtualization application of hypervisor 114 may, on some levels, interact indirectly with computing system resources via the operating system, and, on other levels, interact directly with computing system resources (e.g., similar to the way the operating system interacts directly with computing system resources, or as firmware running on computing system resources). As a further alternative, the virtualization application of hypervisor 114 may, on all levels, interact directly with computing system resources (e.g., similar to the way the operating system interacts directly with computing system resources, or as firmware running on computing system resources) without utilizing the operating system, although still interacting with the operating system to coordinate use of computing system resources. Active portions of hypervisor 114 may be transferred from storage media to memory 104 for execution by processor 103.

Operating system 116 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 116. Active portions of operating system 116 may be transferred to memory 104 for execution by processor 103.

Application 118 may comprise any program of executable instructions, or aggregation of programs of executable instructions, configured to, when read and executed by processor 103, interact with operating system 116 in order to perform a group of coordinated functions, tasks, or activities. For example, one or more application programs may comprise an application configured to perform input/output operations (e.g., reads and writes) to storage resource 110 and/or remote storage 130.

Storage management console 120 may comprise any program of executable instructions, or aggregation of programs of executable instructions, configured to, when read and executed by processor 103, facilitate disaster recovery, as described in greater detail herein. For example, storage management console 120 may be aware of applications configured to consume storage space within storage resource 110, and may maintain metadata (e.g., connectivity and configuration information) for remote storage 130 (e.g., which portions of remote storage 130 map to storage addresses exposed to application 118). In operation, storage management console 120 may also, via network 160, copy such metadata to a replica storage management console 140 executing on secondary information handling system 122. In some embodiments, storage management console 120 may execute within a guest operating system running on hypervisor 114 or may itself comprise a guest operating system configured to run on hypervisor 114.

Storage virtual controller 121 may comprise any program of executable instructions, or aggregation of programs of executable instructions, configured to, when read and executed by processor 103, emulate and/or simulate a physical storage controller to facilitate input/output between primary information handling system 102 and remote storage 130, as described in greater detail elsewhere herein. In some embodiments, storage virtual controller 121 may execute within a guest operating system running on hypervisor 114 (e.g., a keyboard-video-mouse hypervisor) or may itself comprise a guest operating system configured to run on hypervisor 114 (e.g., a keyboard-video-mouse hypervisor).

Although hypervisor 114, operating system 116, application 118, storage management console 120, and storage virtual controller 121, are shown in FIG. 1 as stored in memory 104, in some embodiments, one or more of hypervisor 114, operating system 116, application 118, storage management console 120, and storage virtual controller 121 may be stored in storage media accessible to processor 103 (e.g., storage resource 110 and/or remote storage 130), and active portions of hypervisor 114, operating system 116, application 118, storage management console 120, and storage virtual controller 121 may be transferred from such storage media to memory 104 for execution by processor 103.

Physical storage controller 106 may include any system, apparatus, or device operable to manage the communication of data between processor 103 and storage resource 110. In certain embodiments, physical storage controller 106 may provide functionality including, without limitation, disk aggregation and redundancy (e.g., RAID), I/O routing, and error detection and recovery. Physical storage controller 106 may also have features supporting shared storage and high availability. In some embodiments, physical storage controller 106 may comprise a PowerEdge RAID Controller (PERC) manufactured by Dell Inc.

Storage resources 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on primary information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to primary information handling system 102, in some embodiments, storage resource 110 may be external to primary information handling system 102 (e.g., embodied by a physical array of external hard disk drives).

Network interface 108 may comprise any suitable system, apparatus, or device operable to serve as an interface between primary information handling system 102 to one or more other information handling systems (e.g., secondary information handling system 122, remote storage 130) via network 160. Network interface 108 may enable primary information handling system 102 to communicate using any suitable transmission protocol and/or standard. In these and other embodiments, network interface 108 may comprise a network interface card, or "NIC." In other embodiments, network interface 108 may be implemented as a virtual NIC (e.g., implemented by software configured to execute on processor 103 of primary information handling system 102). In yet other embodiments, network interface 108 may comprise another type of data transfer card, such as a Fibre Channel card.

In addition to processor 103, memory 104, and physical storage controller 106, storage resource 110, and network interface 108, primary information handling system 102 may include one or more other information handling resources.

In some embodiments, secondary information handling system 122 may comprise a server. In these and other embodiments, secondary information handling system 122 may comprise a personal computer. In other embodiments, secondary information handling system 122 may be a portable computing device (e.g., a laptop, notebook, tablet, handheld, smart phone, personal digital assistant, etc.). As depicted in FIG. 1, secondary information handling system 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of secondary information handling system 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to primary information handling system 122 is turned off.

As shown in FIG. 1, memory 124 may have stored thereon a hypervisor 114, an operating system 116, an application 118, a storage management console 140, and a storage virtual controller 141. Hypervisor 114, operating system 116, and/or application 118 of secondary information handling system 122 may be identical or similar to hypervisor 114, operating system 116, and application 118, respectively, of primary information handling system 102.

Storage management console 140 may comprise any program of executable instructions, or aggregation of programs of executable instructions, configured to, when read and executed by processor 103, facilitate disaster recovery, as described in greater detail herein. For example, storage management console 140 may be aware of applications configured to consume storage space within storage resource 110, and may maintain metadata (e.g., connectivity and configuration information) for remote storage 130 (e.g., which portions of remote storage 130 map to storage addresses exposed to application 118). In operation, storage management console 140 may also, via network 160, receive such metadata from storage management console 120 executing on primary information handling system 102, such that, during normal operation, storage management console 140 acts as a replica of storage management console 120. In some embodiments, storage management console 140 may execute within a guest operating system running on hypervisor 114 or may itself comprise a guest operating system configured to run on hypervisor 114.

Storage virtual controller 141 may comprise any program of executable instructions, or aggregation of programs of executable instructions, configured to, when read and executed by processor 123, emulate and/or simulate a physical storage controller to facilitate input/output between primary information handling system 122 and remote storage 130, as described in greater detail elsewhere herein. In some embodiments, storage virtual controller 141 may execute within a guest operating system running on hypervisor 114 or may itself comprise a guest operating system configured to run on hypervisor 114.

Although hypervisor 114, operating system 116, application 118, storage management console 140, and storage virtual controller 141, are shown in FIG. 1 as stored in memory 124, in some embodiments, one or more of hypervisor 114, operating system 116, application 118, storage management console 140, and storage virtual controller 141 may be stored in storage media accessible to processor 123 (e.g., remote storage 130), and active portions of hypervisor 114, operating system 116, application 118, storage management console 140, and storage virtual controller 141 may be transferred from such storage media to memory 124 for execution by processor 123.

Network interface 128 may comprise any suitable system, apparatus, or device operable to serve as an interface between secondary information handling system 122 to one or more other information handling systems (e.g., primary information handling system 102, remote storage 130) via network 160. Network interface 128 may enable secondary information handling system 122 to communicate using any suitable transmission protocol and/or standard. In these and other embodiments, network interface 128 may comprise a network interface card, or "NIC." In other embodiments, network interface 128 may be implemented as a virtual NIC (e.g., implemented by software configured to execute on processor 123 of secondary information handling system 122). In yet other embodiments, network interface 128 may comprise another type of data transfer card, such as a Fibre Channel card.

In addition to processor 123, memory 124, and network interface 128, secondary information handling system 122 may include one or more other information handling resources.

Remote storage 130 may include any computer-readable media configured to store data associated with primary information handling system 102, secondary information handling system 122, and/or other information handling systems. In some embodiments, remote storage 130 may be part of or associated with a cloud service (e.g., maintained by a third party) which may include any suitable service for maintaining documents associated with or accessible to information handling system 102, secondary information handling system 122, and/or other information handling systems, or performing a service with respect to such documents to modify, transform, or reformat such a document. For example, such a third-party cloud service may include a file storage and/or file synchronization service.

Network 160 may be a network and/or fabric configured to couple user primary information handling system 102, secondary information handling system 122, and/or remote storage 130 to each other. In some embodiments, network 160 may include a communication infrastructure, which provides physical connections, and a management layer, which organizes the physical connections and information handling systems communicatively coupled to network 160. Network 160 may be implemented as, or may be a part of, a storage area network (SAN), a PAN, a LAN, a metropolitan area network (MAN), a WAN, a wireless local area network (WLAN), a virtual private network (VPN), an intranet, the Internet or any other appropriate architecture or system that facilitates the communication of signals, data and/or messages (generally referred to as data). Network 160 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 160 and its various components may be implemented using hardware, software, or any combination thereof.

In addition to primary information handling system 102, secondary information handling system 122, remote storage 130, and network 160, system 100 may include one or more other information handling resources.

Figure 2:
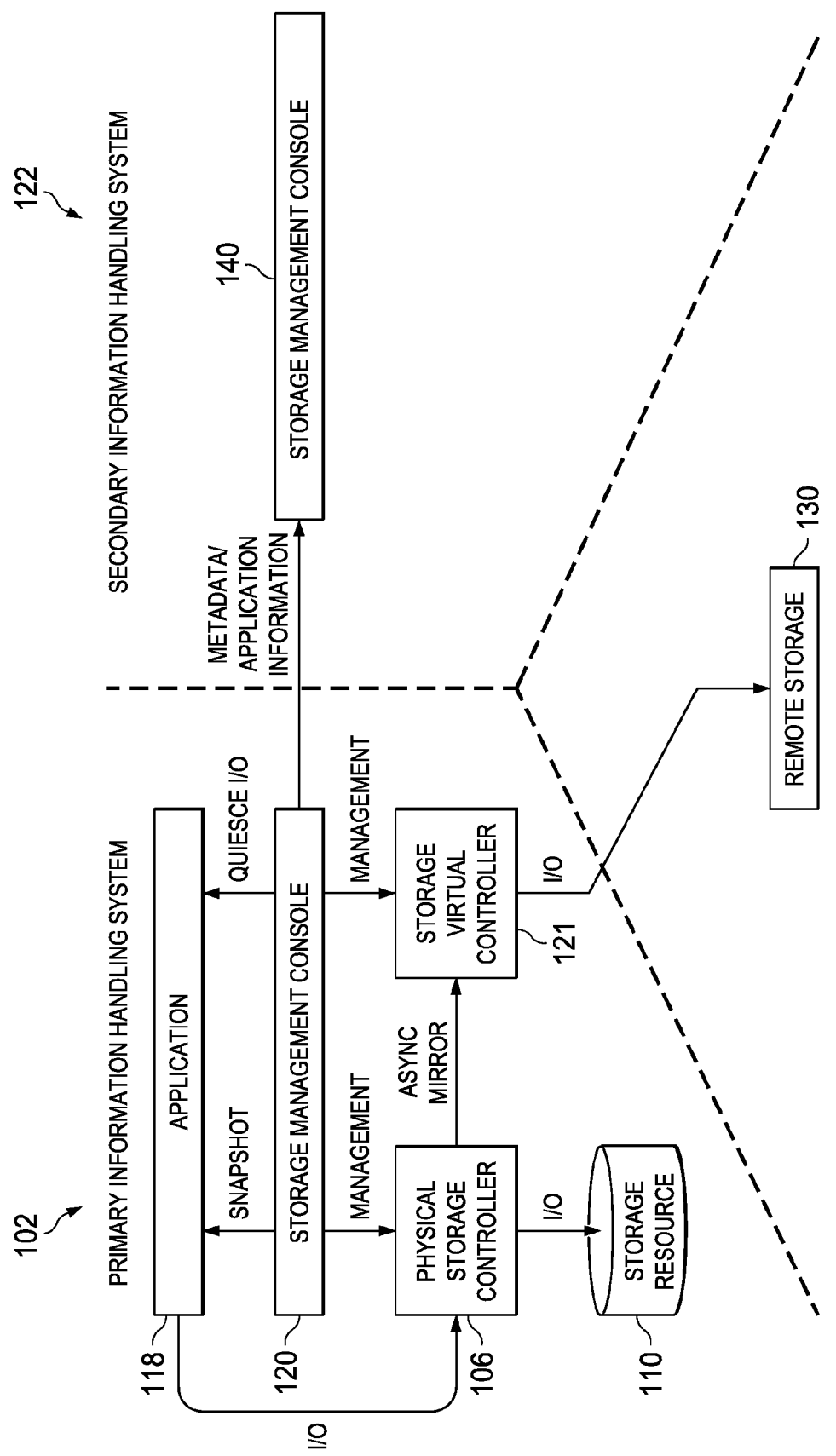
FIG. 2 illustrates a block diagram of a hierarchy for various components of the system depicted in FIG. 1 during a normal operational mode of the system, in accordance with embodiments of the present disclosure.

FIG. 2 illustrates a block diagram of a hierarchy for various components of system 100 during a normal operational mode of system 100, in accordance with embodiments of the present disclosure. In the normal operational mode, one or more applications 118 hosted by primary information handling system 102 may be provided storage from storage resource 110 coupled to physical storage controller 106. Storage management console 120 may be aware of applications 118 consuming storage from storage resource 110 and/or may maintain metadata regarding configuration details of storage virtual controller 121 (e.g., mappings between applications and logical units of remote storage storing data for such applications). Storage virtual controller 121 may act as a data mover for data to be moved from primary information handling system 102 to remote storage 130. Storage virtual controller 121 may be configured to move data to and/or from remote storage 130 using Internet Small Computer System Interface (iSCSI) or other suitable protocol and/or standard. Storage management console 120 may be configured to provision storage units (e.g., logical units or "LUNs") on remote storage 130 and configuring storage virtual controller 121 to consume such storage units.

Storage management console 120 may also configure an asynchronous mirror relationship between physical storage controller 106 and storage virtual controller 121 such that all data written to physical storage controller 106 is also written to storage virtual controller 121. In some embodiments, storage virtual controller 121 may perform write-through caching such that all input/output communications directed to it as part of the mirror relationship is written directly to remote storage 130 without any caching. By having an asynchronous mirror relationship, rather than having physical storage controller 106 write directly to remote storage 130, latencies associated with directing input/output communications to remote storage 130 fall on storage virtual controller 121, freeing the input/output path to storage resource 110 from losing processing resources, as might occur over a synchronous mirror relationship.

To initiate the mirroring described above, application-consistent snapshots may be periodically taken by storage management console 120. When taking snapshots, storage management console 120 may cause application 118 to quiesce input/output communications, take the application-consistent snapshot, and store metadata associated with the data. For example, such stored metadata may include, without limitation, storage configuration information of application 118 (e.g., the number of volumes exposed to a host of the application, their World Wide Name identifiers, etc.), information regarding the application consistent snapshot and its available replicas, internal storage configuration information regarding storage virtual controller 121 such that a replica storage virtual controller 141 may be instantiated with a like configuration at secondary information handling system 122 in the event of failover, and/or connection and authentication information for accessing logical units of remote storage 130 associated with the data. Such metadata may be cached by storage management console 120 and copied to storage management controller 140 of secondary information handling system 122.

Figure 3:
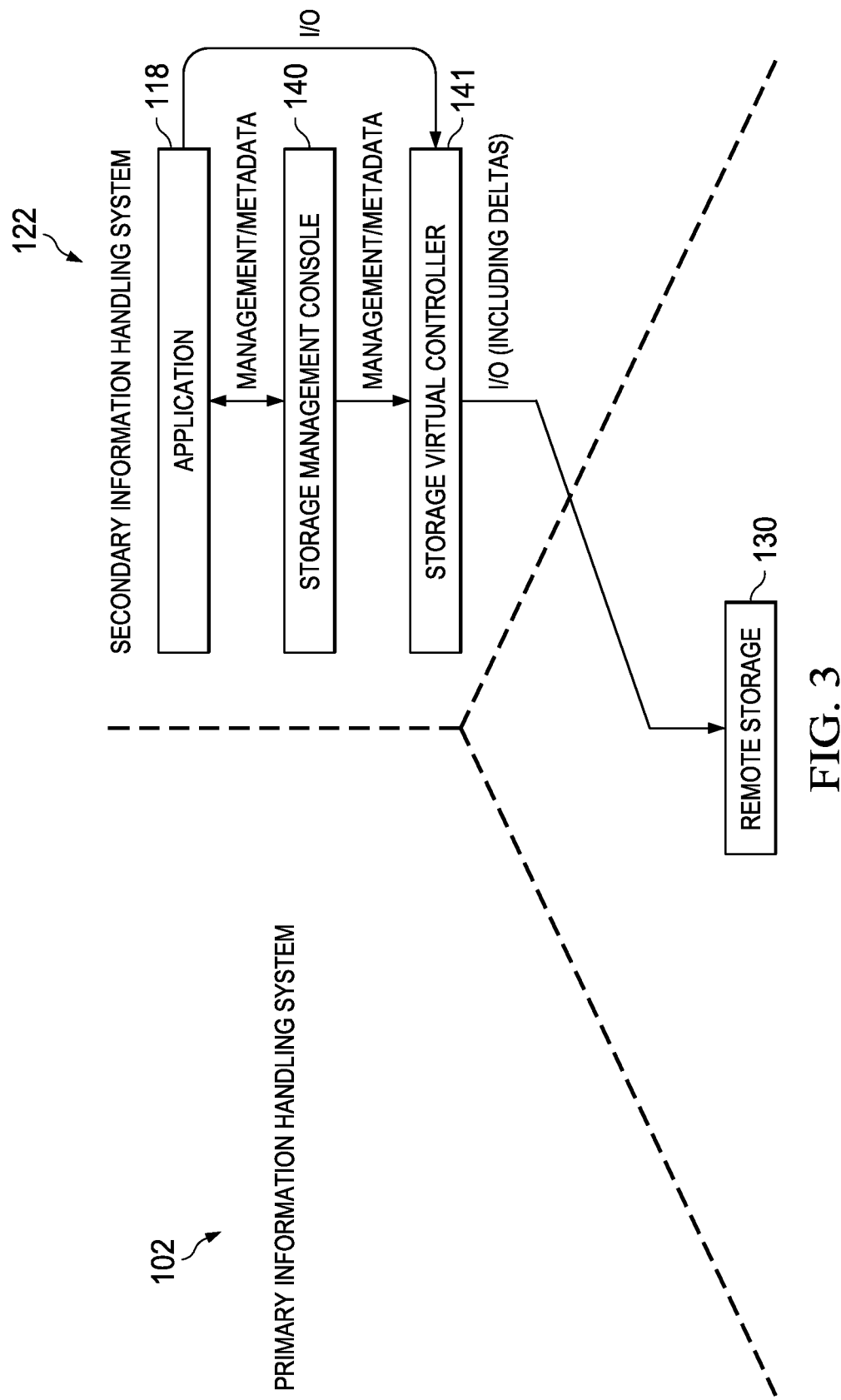
FIG. 3 illustrates a block diagram of a hierarchy for various components of the system depicted in FIG. 1 during a disaster recovery mode of the system, in accordance with embodiments of the present disclosure.

FIG. 3 illustrates a block diagram of a hierarchy for various components of system 100 during a disaster recovery mode of system 100, in accordance with embodiments of the present disclosure. In the event of a fault or failure of primary information handling system 102, storage management console 140 of secondary information handling system 122 may use the metadata and application information copied from storage management console 120 during the normal operational mode in order to configure application 118 and storage virtual controller 141 to continue operation at secondary information handling system 122 to access data of application 118 from remote storage 130. Thus, when the disaster recovery mode is triggered by a fault or failure of primary information handling system 102, storage management console 140 of secondary information handling system 122 may, based on the metadata and application information copied from storage management console 120 during the normal operational mode:

determine a configuration for storage virtual controller 141 and spawn storage virtual controller 141 such that it replicates the configuration of storage virtual controller 121;

configure storage virtual controller 141 to consume logical units of remote storage 130 which stored the data of application 118 of primary information handling system 102 and expose volumes of the logical units to a replica of application 118 at secondary information handling system 122; and/or interface with application 118 to permit application 118 to perform consistency checks on the exposed volumes.

After volumes of logical units of remote storage 130 are exposed to application 118, secondary information handling system 122 effectively operates as a remote storage (e.g., cloud-backed) disaster recovery site with input/output communications taking place via application 118 and remote storage 130, with storage virtual controller 141 interfacing between the two. In the disaster recovery mode, storage management console 140 may maintain a log to track changes or deltas caused by writes from application 118. In some embodiments, storage management console 140 may cause such delta information to be stored on a logical unit of remote storage 130, with storage management console 140 storing metadata associated with the delta information.

Figure 4:
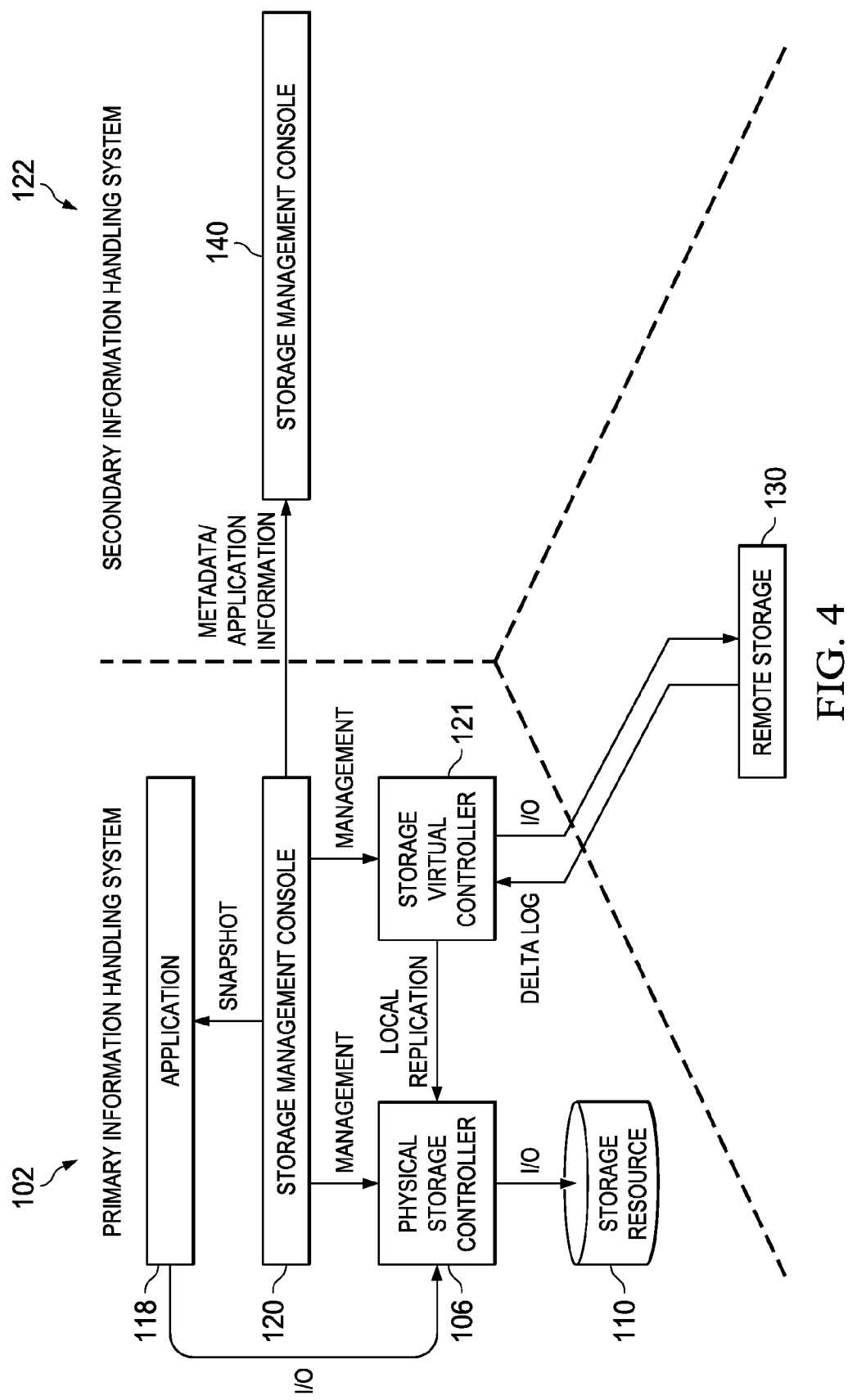
FIG. 4 illustrates a block diagram of a hierarchy for various components of the system depicted in FIG. 1 during a fail-back mode of the system, in accordance with embodiments of the present disclosure.

FIG. 4 illustrates a block diagram of a hierarchy for various components of system 100 during a fail-back mode of system 100, in accordance with embodiments of the present disclosure. In the event of removal of the fault or failure of primary information handling system 102 or replacement of a failed primary information handling system 102 with a new primary information handling system 102, storage management console 140 and storage management console 120 may operate in concert to transfer data to primary information handling system 102 and reconfigured primary information handling system 102 as needed. Thus, during the fail-back mode, storage management console 140 may copy metadata and application information to storage management console 120 to update any configuration information made during the time primary information handling system 102 was down. Alternatively, storage management console 120 may read from remote storage 130 regarding configuration changes made during the time information handling system 102 was down. Storage management console 120 may also re-spawn storage virtual controller 121 and cause it to read the delta log from remote storage 130 and replicate those changes to physical storage controller 106 such that the changes are made on storage resource 110. Then storage management console 120 may cause application 118 to perform input/output to physical storage controller 106 and re-enter the normal operation mode.

FIG. 5 illustrates a block diagram of a hierarchy for various components of system 100 during normal operation in a single-site system in which secondary information handling system 122 is not present, in accordance with embodiments of the present disclosure. In such single-site system, storage virtual controller 121 may act as the input/output interface between application 118 and remote storage 130 when physical storage controller 106 has experienced fault or failure. All such input/output may be tracked by a delta change log which may be communicated to physical storage controller 106 when it recovers from failure or fault.

Advantageously, remote storage 130 (which may be a cloud-based storage repository) may serve as a go-between between primary information handing system 102 and secondary information handling system 122. Another advantage to the systems and methods herein is that secondary information handling system 122 may include only virtual components, thus potentially reducing cost.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a first storage management console comprising a program of executable instructions embodied in non-transitory computer-readable media accessible to the processor, and configured to, when read and executed by the processor:
  manage input/output between an application and a primary physical storage controller to perform input/output between the application and a storage resource communicatively coupled to primary physical storage container;
  asynchronously mirror application-consistent snapshots of data associated with the application from the primary physical storage controller to a storage virtual controller configured to emulate a physical storage controller such that the storage virtual controller stores the snapshots to remote storage geographically remote from the information handling system;
  store metadata associated with the application and data stored to the storage resource and the remote storage; and
  copy the metadata to a second storage management console executing on a second information handling system geographically remote from the information handling system.

2. The information handling system of claim 1, wherein the second information handling system is geographically remote from the remote storage.

3. The information handling system of claim 1, wherein, in response to a failure or fault of the information handling system, the second storage management console is configured to spawn a second storage virtual controller at the second information handling system based on the metadata in order to facilitate input/output between a replica instantiation of the application and the remote storage.

4. The information handling system of claim 1, wherein the second storage virtual controller is configured to store to the remote storage a delta file indicative of write input/output made by a replica of the application at the second information handling system during the fault or failure.

5. The information handling system of claim 1, wherein the first storage management console is further configured to, upon removal of a fault or failure of information handling system:
   receive modified metadata from the second storage management console; and
   re-spawn storage virtual controller at the information handling system based on the modified metadata in order to facilitate input/output between the application and physical storage controller.

6. The information handling system of claim 5, wherein the first storage virtual controller is configured to:
   read a delta file from the remote storage indicative of write input/output made by a replica of the application at the second information handling system during the fault or failure; and
   replicate data consistent with the delta file to the physical storage controller.

7. A method comprising:
   managing, by a first storage management console instantiated on a first information handling system, input/output between an application and a primary physical storage controller to perform input/output between the application and a storage resource communicatively coupled to the primary physical storage controller;
   asynchronously mirroring, by the first storage management console, application-consistent snapshots of data associated with the application from the primary physical storage controller to a storage virtual controller configured to emulate a physical storage controller such that the storage virtual controller stores the snapshots to remote storage geographically remote from the first information handling system;
   storing, by the first storage management console, metadata associated with the application and data stored to the storage resource and the remote storage; and
   copying, by the first storage management console, the metadata to a second storage management console executing on a second information handling system geographically remote from the first information handling system.

8. The method of claim 7, wherein the second information handling system is geographically remote from the remote storage.

9. The method of claim 7, wherein, in response to a failure or fault of the first information handling system, the second storage management console is configured to spawn a second storage virtual controller at the second information handling system based on the metadata in order to facilitate input/output between a replica instantiation of the application and the remote storage.

10. The method of claim 7, wherein the second storage virtual controller is configured to store to the remote storage a delta file indicative of write input/output made by a replica of the application at the second information handling system during a fault or failure.

11. The method of claim 7, further comprising, upon removal of a fault or failure of the first information handling system:
   receiving, by the first storage management console, modified metadata from the second storage management console; and
   re-spawning, by the first storage management console, the first storage virtual controller at the first information handling system based on the modified metadata in order to facilitate input/output between the application and physical storage controller.

12. The method of claim 7, further comprising causing the storage virtual controller to:
   read a delta file from the remote storage indicative of write input/output made by a replica of the application at the second information handling system during a fault or failure; and
   replicate data consistent with the delta file to the primary physical storage controller.

13. An article of manufacture comprising:
   a non-transitory computer readable medium; and
   computer-executable instructions carried on the computer readable medium, the instructions readable by a processor, the instructions, when read and executed, for causing the processor to:
      manage, by a first storage management console instantiated on a first information handling system, input/output between an application and a primary physical storage controller to perform input/output between the application and a storage resource communicatively coupled to the primary physical storage controller;
      asynchronously mirror, by the first storage management console, application-consistent snapshots of data associated with the application from the physical storage controller to a storage virtual controller configured to emulate a physical storage controller such that the storage virtual controller stores the snapshots to remote storage geographically remote from the first information handling system;
      store, by the first storage management console, metadata associated with the application and data stored to the storage resource and the remote storage; and
      copy, by the first storage management console, the metadata to a second storage management console executing on a second information handling system geographically remote from the first information handling system.

14. The article of claim 13, wherein the second information handling system is geographically remote from the remote storage.

15. The article of claim 13, wherein, in response to a failure or fault of the first information handling system, the second storage management console is configured to spawn a second storage virtual controller at the second information handling system based on the metadata in order to facilitate input/output between a replica instantiation of the application and the remote storage.

16. The article of claim 13, wherein the second storage virtual controller in configured to store to the remote storage a delta file indicative of write input/output made by a replica of the application at the second information handling system during a fault or failure.

17. The article of claim 13, the instructions further causing the processor to:

receive, by the first storage management console, modified metadata from the second storage management console; and re-spawn, by the first storage management console, the storage virtual controller at the first information handling system based on the modified metadata in order to facilitate input/output between the application and physical storage controller.

18. The article of claim 17, further comprising causing the storage virtual controller to:

read a delta file from the remote storage indicative of write input/output made by a replica of the application at the second information handling system during a fault or failure; and replicate data consistent with the delta file to the physical storage controller.

* * * * *